United States Patent Office.

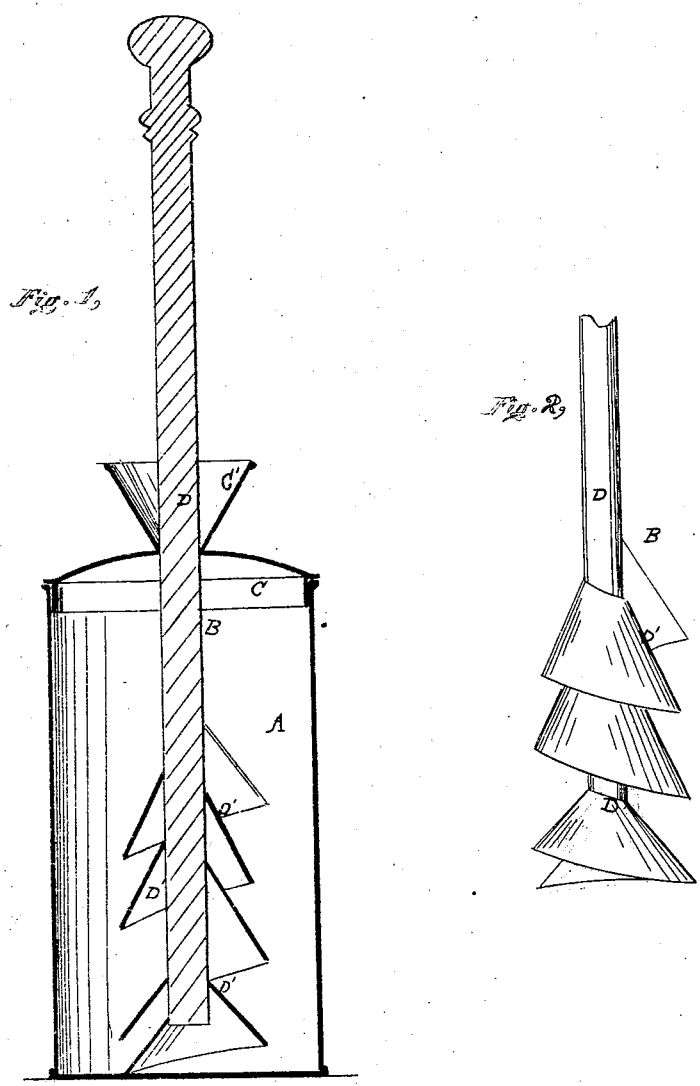

F. W. ROBBINS, OF SOLON, OHIO.

Letters Patent No. 71,645, dated December 3, 1867.

---

IMPROVEMENT IN CHURNS.

---

The Schedule referred to in these Letters Patent and making part of the same.

---

TO ALL WHOM IT MAY CONCERN:

Be it known that I, F. W. ROBBINS, of Solon, in the county of Cuyahoga, and State of Ohio, have invented certain new and useful Improvements in Churns; and I do hereby declare that the following is a full and complete description of the same, reference being had to the accompanying drawings, making a part of this specification, in which—

Figure 1 is a vertical transverse section.

Figure 2 is a detached section.

Like letters of reference refer to like parts in the views.

In the drawing, A represents the case of the churn, in which the dasher B plays. This case can be made of the form and material of ordinary vertical churns. C is the cover, which is provided with a flaring funnel-shaped mouth, C'. This is to prevent the cream from being thrown out on to the churn by the shaft passing up and down through the cover. B, the dasher, is composed of the shaft D, around the lower end of which is coiled the galvanized zinc D, or any other suitable material. A detached view of this dasher is shown in fig. 2. The spiral coil D', which constitutes, with the shaft B, the dasher, is represented in the drawing as being made in two sections, but, if desired, can be made of one entire coil, or of several sections. The advantage in having the dasher made spiral, as described, is that it agitates the cream more thoroughly than the ordinary dashers, by giving to it a spiral motion, and thus all of it is agitated, and the cream churned without much labor. This form of dasher may be applied to any of the ordinary wood or stone churns having this vertical movement.

What I claim as my improvement, and desire to secure by Letters Patent, is—

A churn-dasher, when constructed with a spiral beater, D', continuous or in sections, in the manner substantially as set forth.

F. W. ROBBINS.

Witnesses:
J. H. BURRIDGE,
T. B. EMERSON.